(12) United States Patent
Allman et al.

(10) Patent No.: US 6,676,142 B2
(45) Date of Patent: Jan. 13, 2004

(54) METHOD FOR PROVIDING ADJUSTABLE VEHICLE BALL JOINT POSITIONING

(75) Inventors: Robert M. Allman, Longmont, CO (US); James H. Garrard, Boulder, CO (US)

(73) Assignee: Ingalls Engineering Company, Inc., Louisville, CO (US)

( * ) Notice: Subject to any disclaimer, the term of this patent is extended or adjusted under 35 U.S.C. 154(b) by 0 days.

(21) Appl. No.: 10/290,583

(22) Filed: Nov. 8, 2002

(65) Prior Publication Data

US 2003/0052467 A1 Mar. 20, 2003

Related U.S. Application Data

(63) Continuation of application No. 09/703,780, filed on Oct. 31, 2000, now Pat. No. 6,478,318.

(51) Int. Cl.$^7$ .................................................. B62B 7/00
(52) U.S. Cl. ............................ 280/86.751; 280/86.754; 280/93.512
(58) Field of Search ...................... 280/86.75, 86.751, 280/86.752, 86.754, 86.756, 93.512, 124.127, 124.134

(56) References Cited

U.S. PATENT DOCUMENTS

| | | | | |
|---|---|---|---|---|
| 4,921,271 A | * | 5/1990 | Berry et al. | 280/661 |
| 5,697,632 A | * | 12/1997 | Burman et al. | 280/661 |
| 6,224,075 B1 | * | 5/2001 | McIntyre | 280/86.751 |

* cited by examiner

*Primary Examiner*—Kevin Hurley
*Assistant Examiner*—Tony Winner
(74) *Attorney, Agent, or Firm*—Harold A. Burdick

(57) ABSTRACT

A replacement ball joint apparatus and method for conveniently modifying motor vehicle suspension camber, caster or camber/caster combination angle by means of repositioning a wheel spindle top or bottom relative to a control arm. The apparatus includes a mount assembly secured at one end of a ball joint which is connectable at its other end to the spindle, the mount assembly having a slide with a stud extending therefrom. A guide assembly is securable at the control arm and receives and guides the slide.

17 Claims, 5 Drawing Sheets

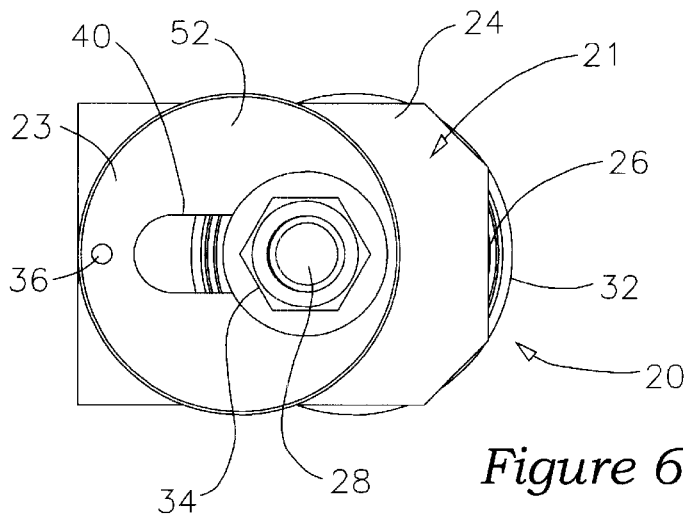
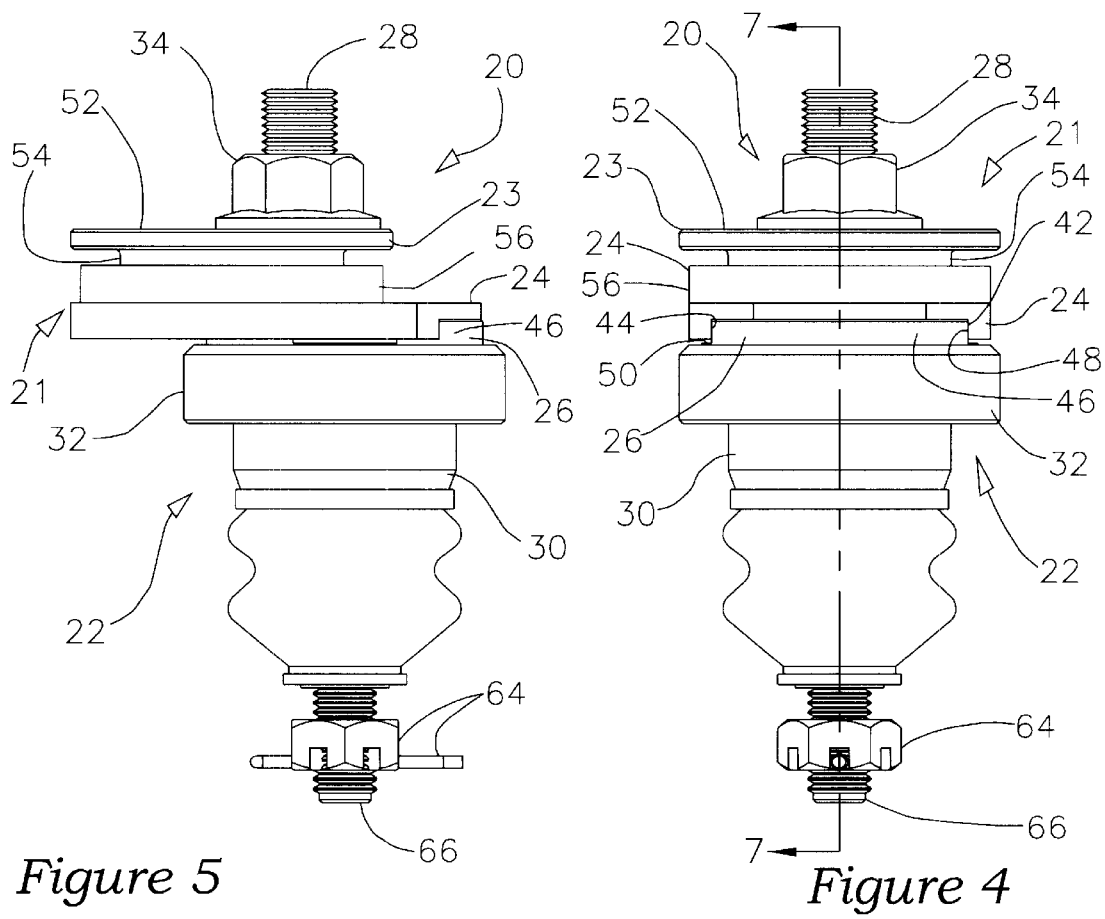
Figure 6
Figure 5
Figure 4

METHOD FOR PROVIDING ADJUSTABLE VEHICLE BALL JOINT POSITIONING

RELATED APPLICATION

This Application is a continuation of U.S. patent application Ser. No. 09/703,780 entitled APPARATUS PROVIDING ADJUSTABLE VEHICLE BALL JOINT POSITIONING filed on Oct. 31, 2000 by the inventors herein (now U.S. Pat. No. 6,478,318 B1 issued Nov. 12. 2002).

FIELD OF THE INVENTION

This invention relates to wheel adjustment/alignment methods for vehicles, and, more particularly, relates to apparatus and methods for adjusting the control arm/wheel spindle relationship at an upper or lower ball joint connection to produce changes in the camber, caster or camber/caster combination angle of a vehicle wheel.

BACKGROUND OF THE INVENTION

Most vehicles consist of a tire/wheel mounted to a spindle which is attached to the vehicle through upper and lower control arms with the main connection being through ball joints mounted to the control arms. Some vehicles, however, are manufactured without provision for adjusting camber angle in the wheels. For example, some vehicles utilize an 'A' shaped upper control arm with 'silent-bloc' type pivot isolators pressed into the inner pivot locations of the arm. The inner control arm in some such cases has a 'u' shaped bracket welded into it, with cross-holes in the inner bracket and inner control arm for locating the mounting bolts that engage and clamp the 'silent-bloc' pivot isolators. This arrangement locates the inner pivots of the upper control arm in a fixed position with no means of adjustment.

The camber and caster angles of the tire/wheel (relative to the vehicle frame) directly effect vehicle handling and tire wear and is therefore of great importance. Camber angle is typically specified by the factory at a specific vehicle ride height (the distance from the ground to some point in the vehicle suspension corresponding to the vehicle frame center of gravity). The camber angle established between the plane of the tire and wheel and the vertical plane through the vehicle frame is directly impacted by any changes in the suspension components. Such changes can occur through damage to the components or through modification, intentional or unintentional, to the vehicle ride height. Thus, vehicles with raised or lowered ride height or damaged suspension links will typically not maintain proper camber angle and require means for readjusting the camber angle to the original specifications if handling and tire longevity are not to be sacrificed. Moreover, it may become desirable to correct a mis-aligned vehicle with other than strictly camber corrections.

One current means for adjusting camber angle consists of changing the relative position of the control arm to the vehicle at the body mounting points. This allows the control arm, and thus the ball joint position, to be moved laterally with respect to the vehicle, thereby changing the camber angle of the spindle and the tire/wheel. This method will not work if the vehicle's control arm mounting scheme prevents replacing the fixed control arm body mounts with an adjustable mounting apparatus.

Another current means for adjusting camber angle provides for replacement of the upper or lower ball joint with an offset ball joint that, when rotated, allows changes of the position of the spindle mounting point around an offset arc. While this enables the camber angle to be modified, it at the same time modifies the caster angle, sometimes undesirably, due to its fixed radial offset arc. Further improvements could thus be utilized

SUMMARY OF THE INVENTION

This invention provides methods for selective positioning of a vehicle ball joint relative to a control arm to provide adjustability of wheel camber, wheel caster, and/or a combination of wheel camber and caster. The method provides for simplicity in installation and adjustment, requires no modification of other suspension components, and provides for adjustment of wheel camber independent of caster adjustment.

The method of this invention for adjusting the relative position of a vehicle ball joint and a central axis of the control arm opening includes the steps of affixing a stud to the ball joint and positioning the stud through the control arm opening. The stud is affixed to the ball joint at an offset relative to a central axis of the ball joint. Linear movement of the stud perpendicular to the axis of the control arm opening is guided while rotational movement of the stud in the opening is stabilized, the offset being secured against possibility of significant rotation once the stud is positioned at the control arm opening. When desired adjustment is achieved, the stud is secured at the selected position relative to the axis of the control arm opening.

The stud extends from a slide, the slide being affixed at an end of the ball joint and defining the offset. An insert is extended through the control arm opening, part of the insert being received adjacent to a guide. Substantially coextensive slots at the guide and the insert are provided for receiving the stud. The slide is received and rotationally stabilized at the guide. Movement of the stud and the slide linearly at the slots and the guide, respectively, position the ball joint.

The method may accommodate caster correction, camber correction, or a combination thereof. Selectable camber correction of a vehicle wheel is accomplished by extending the insert through an opening at a spindle of a vehicle's control arm with the slot selectively oriented (in a caster neutral position).

It is therefore an object of this invention to provide methods for selective positioning of a vehicle ball joint relative to a control arm to provide adjustability of wheel camber, wheel caster, and/or a combination of wheel camber and caster.

It is another object of this invention to provide a method for selective vehicle wheel angle positioning that provides for simplicity in installation and adjustment on a vehicle, requires no modification of other suspension components, and provides for adjustment of wheel camber independent of caster adjustment.

It is yet another object of this invention to provide a method for adjusting relative position of a vehicle ball joint and a central axis of a control arm opening including the steps of affixing a stud to the ball joint, positioning the stud through the control arm opening, guiding linear movement of the stud perpendicular to the axis of the control arm opening while rotationally stabilizing the stud in the opening, and securing the stud at a selected position relative to the axis of the control arm opening.

It is still another object of this invention to provide a method for adjusting relative position of a vehicle ball joint and a central axis of a control arm opening including the steps of affixing a stud to the ball joint at an offset relative to a central axis of the ball joint, positioning the stud through the control arm opening, providing for securement of the offset against possibility of significant rotation and for guidance of linear movement of the stud perpendicular to the axis of the control arm opening, and securing the stud at a selected position relative to the axis of the control arm opening.

It is still another object of this invention to provide a method for selective positioning of a vehicle ball joint securable between a control arm and a wheel mounting, the method including the steps of affixing a stud extending from a slide at an end of the ball joint, extending an insert through the control arm, receiving a part of the insert adjacent to a guide, providing substantially coextensive slots at the guide and the insert, receiving and rotationally stabilizing the slide at the guide, with the stud through the slots, and moving the stud and the slide linearly at the slots and the guide, respectively, to position the ball joint.

It is yet another object of this invention to provide a method for selectable camber correction of a vehicle wheel that includes extending an insert having a slot through an opening at a spindle of a vehicle's control arm with the slot selectively oriented, receiving a guide adjacent to the insert so that a slot at the guide is substantially coextensive with the slot of the insert, affixing a ball joint at one end to the spindle and at another end to a slide having a stud extending from one side thereof, and positioning the slide for linear movement at the guide with the stud through the slots of the guide and the insert to thereby position the stud along the slots.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 4 is a front elevation view of the apparatus of FIG. 3;

FIG. 5 is a side elevation view of the apparatus of FIG. 3;

FIG. 6 is a top elevation view of the apparatus of FIG. 3;

DESCRIPTION OF THE INVENTION

Figure 1:
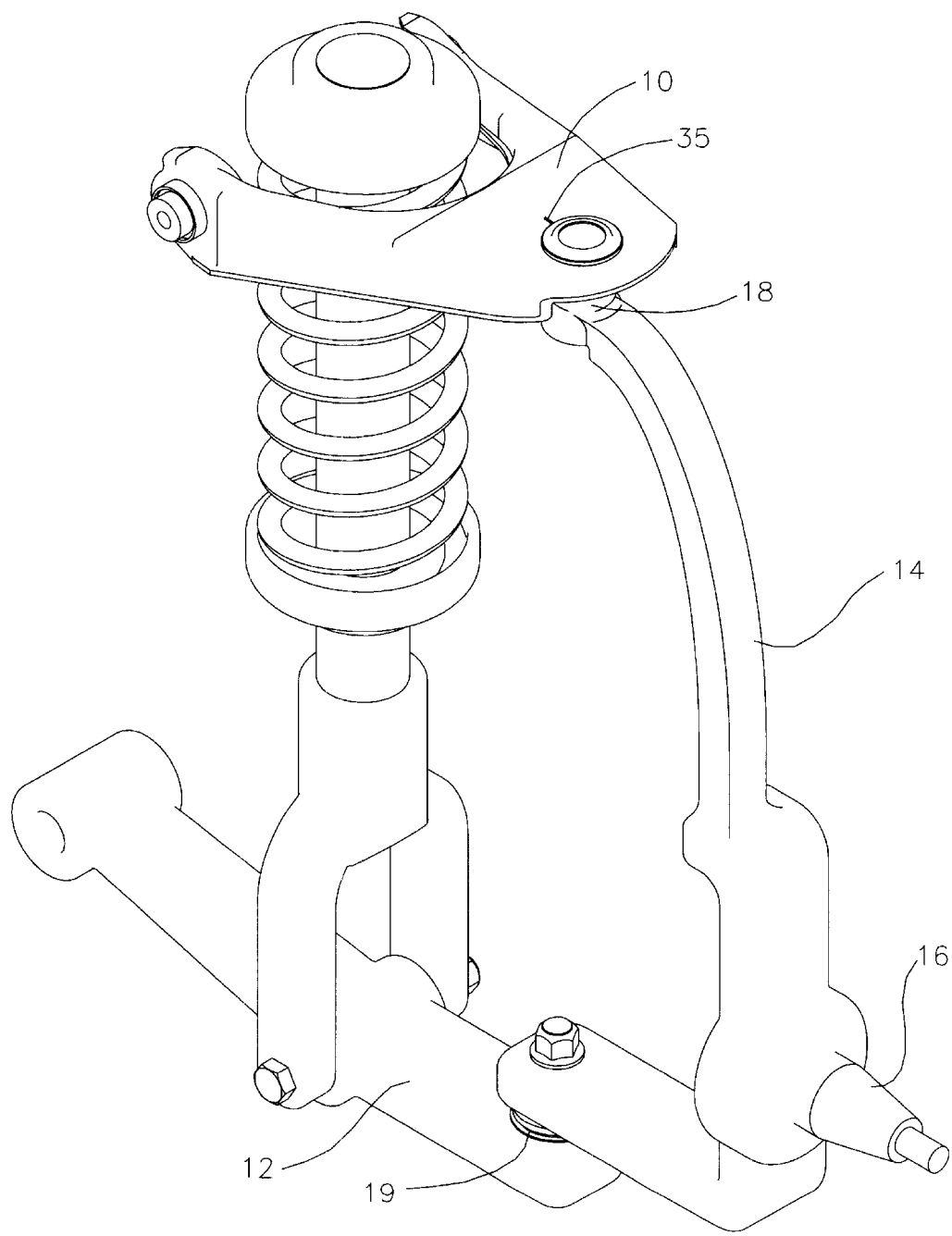
FIG. 1 illustrates a typical suspension system on a vehicle as supplied by a manufacturer.

FIG. 1 illustrates a typical suspension system on a vehicle as supplied by the manufacturer. Upper control arm 10 and lower control arm 12 are both attached to the vehicle frame (not shown). Spindle 14, which includes wheel mount 16 for supporting a wheel with a tire mounted thereon (not shown), is pivotably attached to each control arm through upper ball joint 18 and lower ball joint 19, the ball joints spaced a fixed distance apart by spindle 14.

Figure 2:
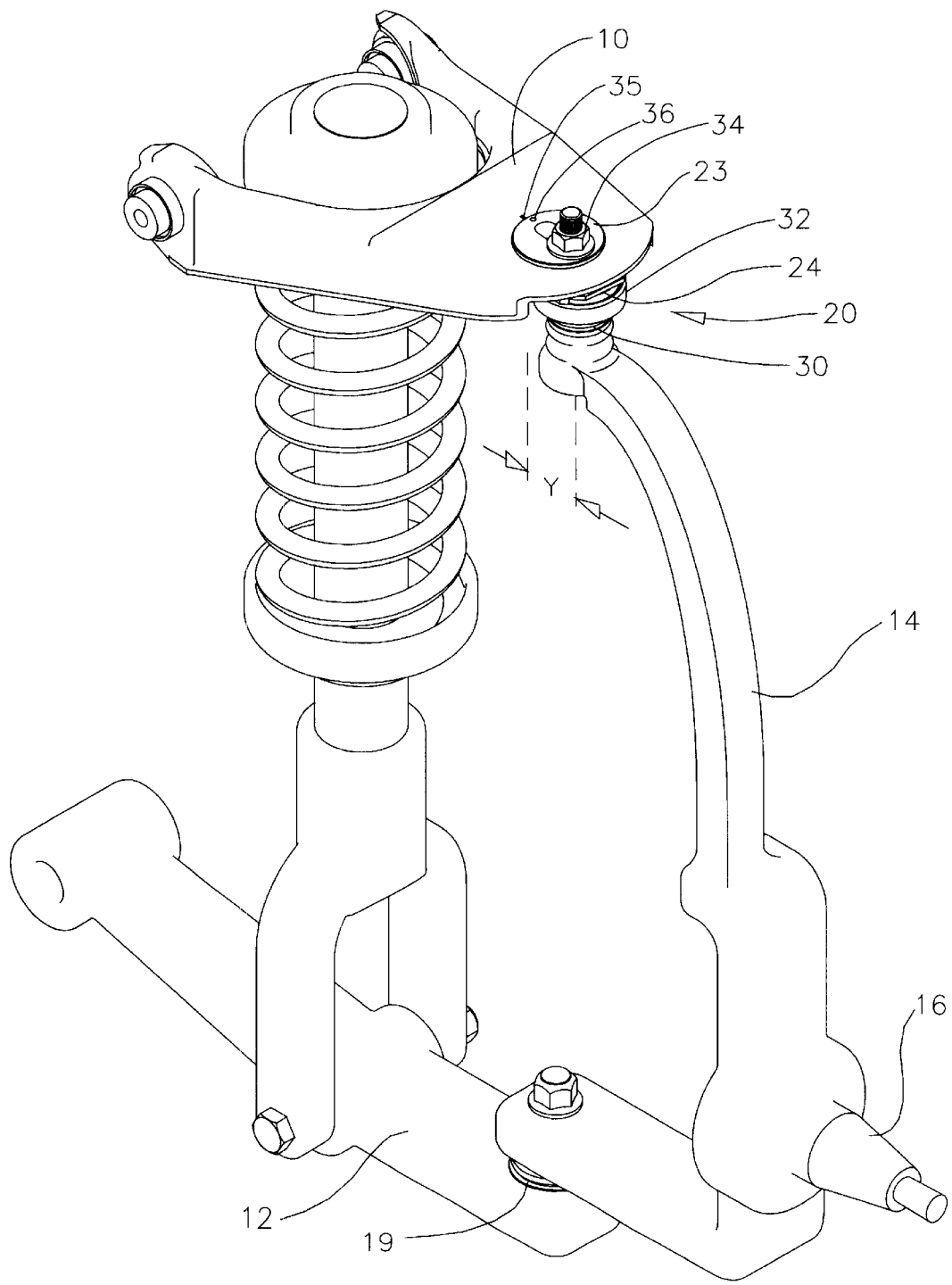
FIG. 2 illustrates the suspension system of FIG. 1 with the apparatus of this invention installed.
Figures 3, 7:
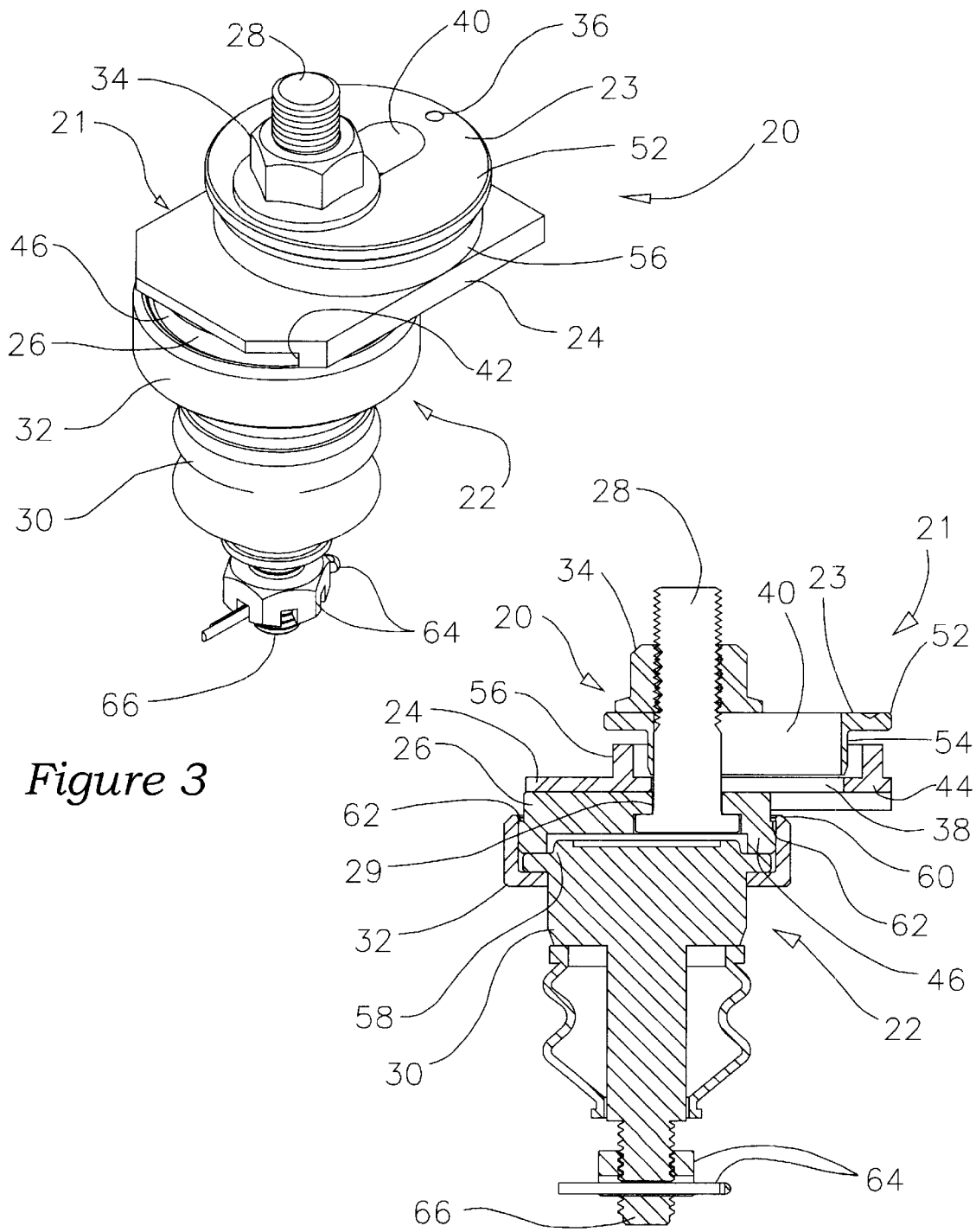
FIG. 3 is a perspective view of the camber/caster adjusting apparatus of this invention.
FIG. 7 is a sectional view taken along section line 7—7 of FIG. 4.

FIG. 2 shows the suspension of FIG. 1 with camber/caster adjusting apparatus 20 of this invention replacing the factory ball joint 18 for selective translation of the position of the upper ball joint along a linear distance "Y", either inward towards the vehicle frame or outward away from the vehicle frame. When set as illustrated and discussed in greater detail hereinbelow, the effect of movement in the "Y" direction will be to decrease or increase, respectively, the camber angle established by the plane of the tire and wheel with the vertical plane of the vehicle frame in the direction from front to back of the vehicle. While use with the upper ball joint is illustrated herein, the apparatus could be applied to replace lower ball joint 19 and/or applied at both locations.

Camber/caster adjusting apparatus 20, as shown in FIGS. 3 through 8, includes guide assembly 21 and mount assembly 22. Guide assembly 21 includes insert 23 and guide plate 24 maintained at opposite sides of control arm opening 25 (see FIG. 8). Mount assembly 22 includes slide 26 having offset stud 28 extending therefrom through opening 29. Ball joint 30 is held at slide 26 by collar 32. The apparatus is held in relative positions, as discussed hereinafter, by fastener 34 (for example a flange nut), ball joint 30 affixable at spindle 14 conventionally.

Insert 23 is pressed into opening 25 of upper control arm 10 (and/or lower control arm 12) in place of the factory supplied ball joint (18 of FIG. 1). For camber only adjustment, insert 23 is oriented along the neutral caster angle by alignment of orientation mark 35 on the control arm (see FIG. 2) and a corresponding dimple or other orientation mark 36 on insert 23. Guide plate 24 and insert 23 each have a slot 38 and 40, respectively, which are substantially coextensive and along which stud 28 is linearly movable. Substantially parallel guide ridges 42 and 44 at guide plate 24 maintain rotational stability and guide linear movement of slide body 46 of slide 26, by guiding engagement adjacent to spaced substantially parallel edges 48 and 50 of slide body 46.

While a particular structure is shown for the guiding and stabilizing interrelationship of guide plate 24 and slide 26, many different configurations at guide plate 24 and mating configuration at slide 26 could be utilized to achieve the same purpose. For example, the guide ridges may be positioned at slide 26 and the matable edges at guide plate 24, or multiple spaced channels or a single centered channel could be provided at either guide plate 24 or slide 26 with corresponding structure at the other configured to ride in the channel or channels.

Insert 23 includes a flange 52 and rim 54, slot 40 defined through rim 54. Rim 54 extends through opening 25 of control arm 10 and is received adjacent to annular extension 56 of guide plate 24. Ball joint 30 is secured at slide 26 by means of a press fit of ball joint end 58 and slide 26 into collar 32 with the addition of a staking process to provide a material deformation of collar end 60 over annular lip 62 of slide 26 to mechanically retain the unit (see FIG. 7). Ball joint 30 may be a factory supplied ball joint and is attached at its other end to spindle 14 using conventional means (applying nut and pin assembly 64 to lower threaded stud 66 after application thereof through opening 67 of spindle 14, for example).

When ball joint 30 is connected to slide 26, it can be seen that the central longitudinal axis of stud 28 is offset relative to the central longitudinal axis of ball joint 30. This offset provides greater extent of wheel angle adjustability, since neutral adjustment, corresponding to alignment of the central axis of ball joint 30 (vertical axis in the FIGURES) with the central axis of opening 25 in control arm 10 (and thus the central axis of insert 23), locates stud 28 near an end of slots 38 and 40 of guide plate 24 and insert 23.

Figure 8:
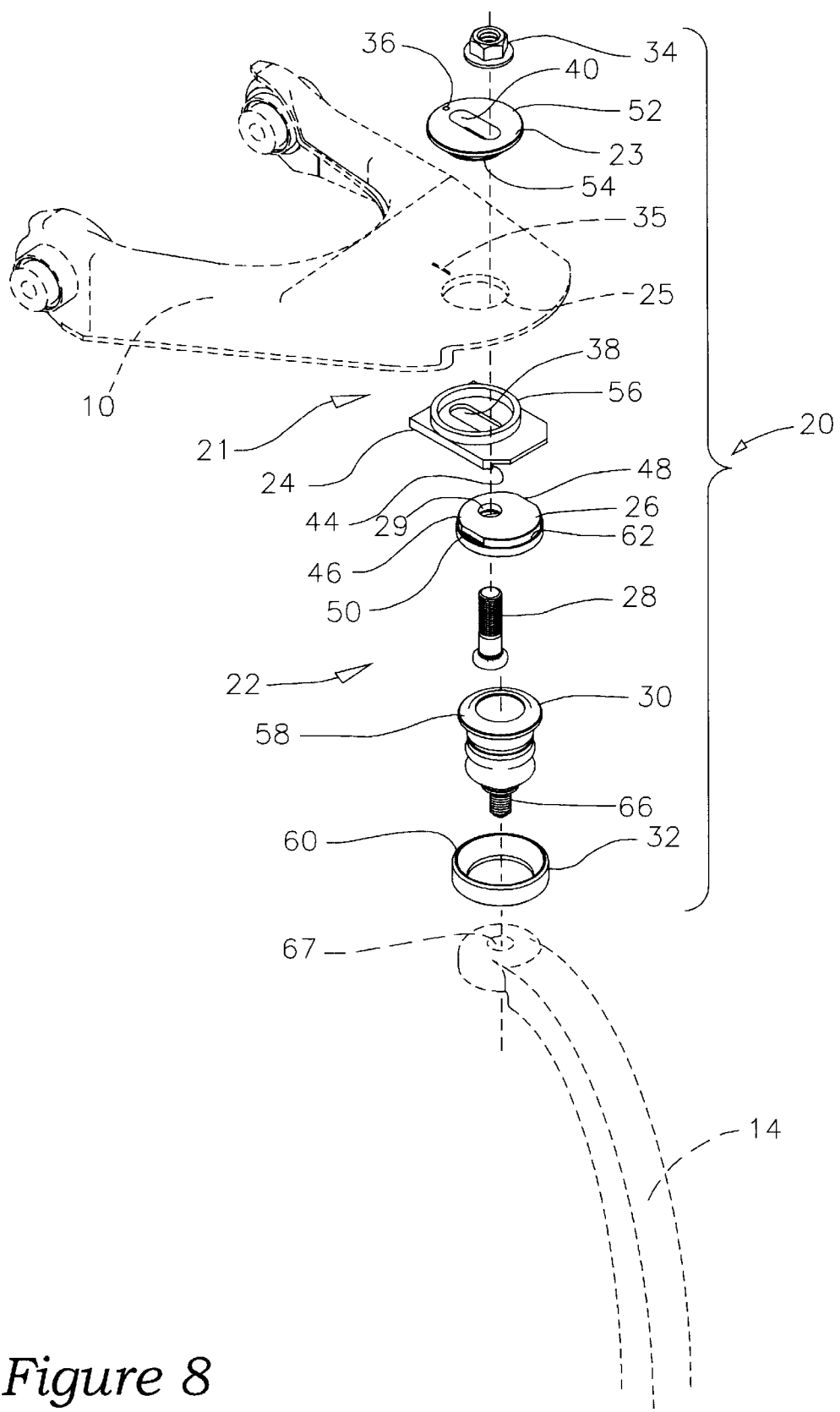
FIG. 8 is an exploded view of the camber/caster adjusting apparatus of this invention.

In use, insert 23 is installed into opening 25 of vehicle suspension control arm 10 (or other selected member) with orientation mark 36 at a selected position to achieve the desired direction of angle adjustability. For example, to allow camber only adjustment, insert 23 should be mounted with marks 35 and 36 aligned as shown in FIGS. 2 and 8 (caster neutral alignment), so that the length of slots 38 and 40 of guide plate 24 and insert 23 are also aligned with the guide marks.

Guide plate 24, with slide 26 thereat having stud 28 extending through slot 38, is positioned at the opposite side of control arm 10. Ball joint 30 may be attached to spindle 14 in advance of or after installation of mount assembly 22 at guide assembly 21 with stud 28 extending through slot 40 of insert 23 (and thus through opening 25 of control arm 10) and held by nut 34. Slide 26, with edges 46 and 48 engaging ridges 42 and 44 of guide plate 24 to stabilize and guide slide 26, when moved in guide plate 24 allows only linear movement of stud 28 in opening 25 perpendicular to the axis of the opening. This sliding movement provides tire/wheel camber adjustment without affecting caster angle (when aligned for caster neutral adjustment as shown in FIG. 2). When the desired angle is achieved (with ball joint 30 and the central axis of opening 25 of control arm 10 in a selected relative position), nut 34 is tightened to retain the interrelationship of the components thus established by securing stud 28 at the selected position relative to the axis of opening 25 and along slots 38/40 and slide 26 at guide plate 24.

Should readjustment be desired, nut 34 may be loosened and mount assembly 22 of apparatus 20 can be moved inward (towards the vehicle frame) or outwards (away from the frame) by moving threaded stud 28 in guide assembly slots 38/40 until the corrected angle is achieved. The position of apparatus 20 is then fixed by applying sufficient torque to flange nut 34.

As may be appreciated, the apparatus of this invention could be modified for installation in such a way as to affect only caster angle or in such a way as to affect both caster and camber angles. A geometric relationship exists between the upper and lower wheel spindle connections (ball joints 18 and 19) and the camber and caster angles of the wheel to the vehicle. As previously indicated, altering the position of one of the ball joints in the neutral caster direction affects the camber angle in a desired fashion. Extending this to caster and camber/caster combination corrections and adjustments, the camber/caster adjusting apparatus of this invention can be used to adjust caster only angles or some combination of camber and caster. If so desired, by rotating insert 23 to another position of orientation mark 36 relative to mark 35 on upper control arm 10 during installation, camber/caster adjusting apparatus 20 can be rotated in a predetermined fashion to provide for adjustment of caster only or some combination of camber and caster angles.

What is claimed is:

1. A method for adjusting relative position of a vehicle ball joint and a central axis of a control arm opening comprising the steps of:

affixing a stud to the ball joint at an offset relative to a central axis of the ball joint;

positioning an insert having a slot in the control arm opening;

positioning the stud through the control arm opening with the stud extending through the slot in the insert;

providing for securement of the offset against possibility of significant rotation and for guidance of linear movement of the stud perpendicular to the axis of the control arm opening; and securing the stud at a selected position relative to the axis of the control arm opening.

2. The method of claim 1 wherein the step of guiding linear movement of the stud includes positioning a slotted guide at the control arm opening.

3. The method of claim 2 wherein the step of affixing the stud to the ball joint includes securing the ball joint at a slide having the stud extending therefrom, the slide receivable at the guide.

4. The method of claim 1 wherein the step of guiding linear movement of the stud includes guiding the linear movement in a caster neutral direction to adjust wheel camber.

5. The method of claim 1 wherein the step of affixing the stud to the ball joint at an offset includes providing an intermediate member between the stud and the ball joint.

6. The method of claim 1 wherein the step of guiding linear movement of the stud includes guiding the linear movement in a camber neutral direction to adjust wheel caster.

7. The method of claim 1 wherein the step of guiding linear movement of the stud includes guiding the linear movement in a direction to adjust both wheel camber and caster.

8. A method for selective positioning of a vehicle ball joint securable between a control arm and a wheel mounting, the method comprising the steps of:

affixing a stud extending from a slide at an end of the ball joint;

extending an insert through the control arm;

receiving a part of the insert adjacent to a guide;

providing substantially coextensive slots at the guide and the insert;

receiving and rotationally stabilizing the slide at the guide, with the stud through the slots; and moving the stud and the slide linearly at the slots and the guide, respectively, to position the ball joint.

9. The method of claim 8 wherein linearly moving the slide includes locating a surface configuration of the guide and a mating configuration of the slide adjacent to one another when the slide is received at the guide, the configurations selected to accommodate movement of the slide linearly but not rotationally.

10. The method of claim 9 wherein the step of locating a surface configuration and mating configuration includes locating spaced substantially parallel edge portions of the slide adjacent to spaced substantially parallel ridges of the guide when the slide is received at the guide.

11. The method of claim 8 further comprising the step of fixing location of the stud relative to the slots and the slide relative to the guide when the ball joint is positioned.

12. The method of claim 8 further comprising the step of affixing the slide to the end of the ball joint, the stud extending from the slide at an offset position relative to a central axis of the ball joint so that relative positions of the ball joint and the insert are substantially coaxial when the stud is at one position in the slots of the insert and the guide.

13. A method for providing selectable camber correction of a vehicle wheel comprising the steps of:

extending an insert having a slot through an opening at a spindle of a vehicle's control arm with the slot selectively oriented;

receiving a guide adjacent to the insert so that a slot at the guide is substantially coextensive with the slot of the insert;

affixing a ball joint at one end to the spindle and at another end to a slide having a stud extending from one side thereof; and positioning the slide for linear movement at the guide with the stud through the slots of the guide and the insert to thereby position the stud along the slots.

14. The method of claim 13 further comprising the step of engaging a fastener with the stud to releasably secure position of the stud along the slots.

15. The method of claim 13 further comprising the step of positioning the stud at the slide offset relative to a central axis of the ball joint when affixed to the slide.

16. The method of claim 13 wherein the step of extending an insert having a slot through an opening at a spindle of a vehicle's control arm further comprises engaging an annular extension of the guide with a rim of the insert extending through the control arm spindle opening.

17. The method of claim 13 further comprising selectively positioning a mark on the insert relative to a mark adjacent to the control arm spindle opening when extending the insert through the opening to achieve a neutral caster angle orientation.

* * * * *